June 14, 1955 H. T. KRAFT ET AL 2,710,424
RETREADING MOLD
Filed July 26, 1952 3 Sheets-Sheet 1
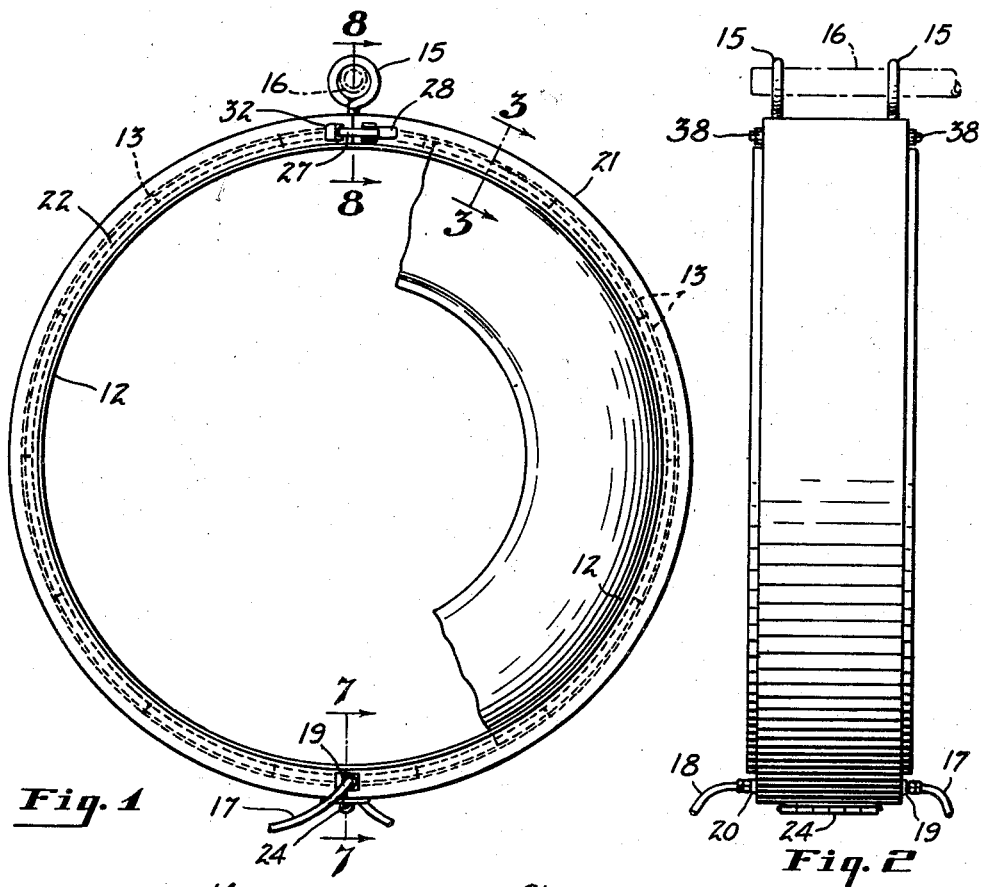
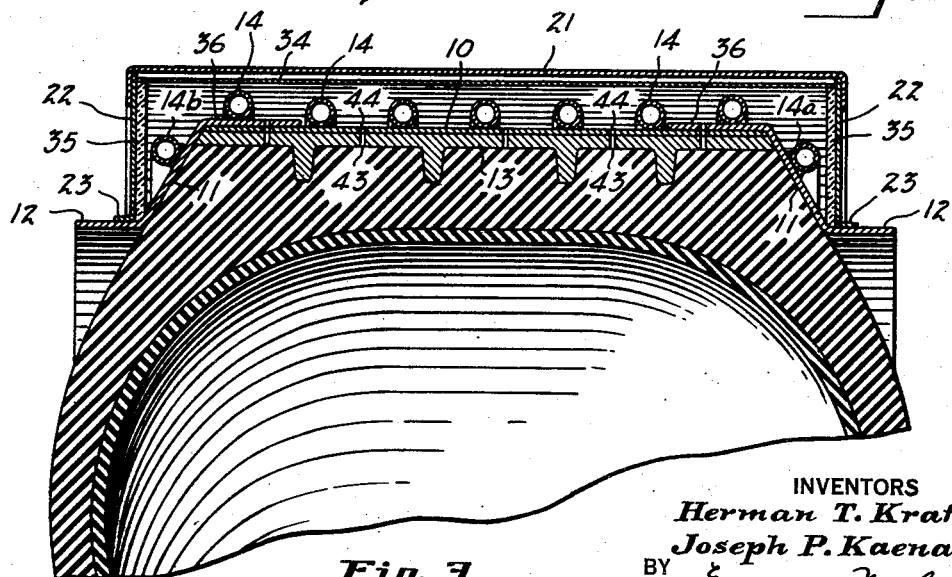
INVENTORS
*Herman T. Kraft*
*Joseph P. Kaenan*
BY *Evans & McCoy*
ATTORNEYS

United States Patent Office 2,710,424
Patented June 14, 1955

2,710,424

RETREADING MOLD

Herman T. Kraft and Joseph P. Kaenan, Akron, Ohio, assignors to The General Tire and Rubber Company, Akron, Ohio, a corporation of Ohio Application July 26, 1952, Serial No. 301,042

11 Claims. (Cl. 18—18)

This invention relates to retread molds of the type in which the heated mold contacts the tread portion only of the tire.

The mold is of a relatively light weight, having a circumferentially continuous annular body formed of relatively thin gauge sheet metal such as sheet steel that is shaped to provide an internal channel of a width and depth to receive a tire tread and that has internally ribbed mold segments in the form of castings of a suitable metal such as an aluminum alloy. The mold segments are of a width to fit within the internal channel of the sheet metal body and abut end to end. The mold segments are attached to the interior of the annular sheet metal body by fastening elements that permit of slight circumferential adjustments of the segments relative to the annular body to provide tight joints between the segments and which will permit slight relative movements between the segments and the mold body due to unequal heat expansion of the metals forming the mold segments and the mold body.

The mold is heated throughout its circumference by means such as steam coils extending around the sheet metal body and attached thereto. The mold is preferably suspended in an upright position by means of hangers attached to the mold body from an overhead support and is provided with an easily detachable heat retaining cover ring that is secured exteriorly to the sheet metal mold body that encloses the steam coils and that is formed of sections having apertures between abutting end portions to accommodate the steam supply and drain fittings and the mold suspension members.

Objects of the invention are to provide a light weight mold of adequate strength that confines the tread stock to be vulcanized and that is provided with means for effectively applying heat to the tread stock and at the tread shoulders as well as to the periphery of the tread, to provide the mold with an easily detachable sectional heat retaining cover ring that encloses the heating elements and that provides outlets between its sections for the mold hangers and steam fittings, and to provide a mold having a circumferentially continuous sheet metal body and mold segments within the body and attached thereto by fastening means that permit circumferential adjustments of the segments relative to the body and relative movements of the segments and mold body when expanded by heat.

Reference should be had to the accompanying drawings forming a part of this specification in which:

Figure 1 is an elevation looking toward a side face of a mold embodying the invention and showing a fragment of a tire casing positioned with its tread in the mold;

Fig. 2 is an elevation looking toward the periphery of the mold and showing it suspended in upright position from an overhead support;

Fig. 3 is a fragmentary transverse section through the mold on an enlarged scale taken on the line indicated at 3—3 in Fig. 1;

Figure 4:
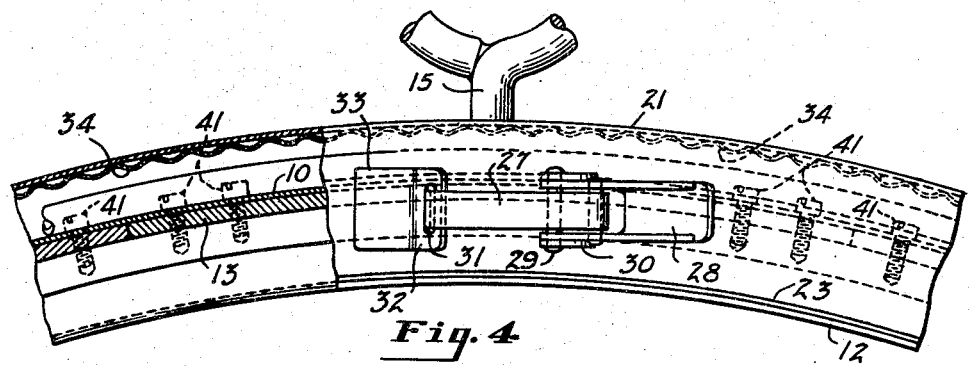
Fig. 4 is a fragmentary side elevation on an enlarged scale of the top portion of the mold showing the clamping latch for securing the cover ring in place and showing a portion of the mold and cover ring in section.

Referring to the accompanying drawings, the mold of the present invention has a circumferentially continuous sheet metal body that has a central portion 10 of substantially cylindrical form and shoulder flanges 11 of frusto-conical form that flare inwardly toward the axis thereof to provide a mold body with an internal channel of a width to receive the tread portion of a tire casing, the depth of the channel being slightly greater than the depth of the retread stock applied to the tire casing so as to engage the shoulder of the tire casing sufficiently to prevent relative movement between the mold and tire casing during the vulcanizing operation, the shoulder flanges 11 having inner outturned edge portions 12 that form external circumferential shoulders at opposite sides of the mold body.

The tire casing with the retread stock applied thereto may be shrunk to a diameter small enough to permit it to be inserted through one of the annular shoulder portions 12 of the mold body by spreading the tire beads and, after the tire casing is positioned with its tread in alinement with the mold channel, the tire beads may be permitted to return to normal position whereupon the tread portion of the casing will expand to its normal diameter and seat itself in the mold channel. Internally ribbed mold segments 13 are attached to the interior of the cylindrical central portion 10 of the mold body, the segments 13 being of a width to fit between the flanges 11 of the mold body and being disposed end to end around the interior thereof.

The mold is provided with suitable heating means extending throughout its circumference such as circumferentially extending steam coils 14 that are attached to the central portion 10 and flanges 11 of the mold body. The mold is supported in upright position by suitable means such as eye bolt hangers 15 that are attached to the mold body adjacent the opposite side thereof and in transverse alinement, the hangers 15 receiving a horizontal overhead supporting rod 16. Pipes 17 and 18 connected to the coils 14 through fittings 19 and 20 attached to the mold flanges at opposite sides of the mold and in transverse alinement diametrically opposite the hangers 15, provide a steam inlet and drain outlet, one of the pipes being connected to a source of steam under pressure and the other being connected to a steam trap through which condensate is drained from the steam coils.

An easily removable heat retaining cover ring is clamped exteriorly upon the mold body and encloses the steam coils. The cover ring is provided with a cylindrical peripheral wall 21 that surrounds the steam coils and that is spaced radially outwardly from the coils. The opposite side edges of the peripheral wall 21 overlie the shoulders 12 at opposite sides of the mold body and the cover ring is provided with side walls 22 that bridge the space between the cylindrical wall 21 and the shoulders 12. The walls 22, which may be formed of sheet metal, are provided with outturned flanges 23 at their inner edges which fit upon the shoulders 12.

The heat retaining cover ring is of sectional construction to permit it to be readily removed from the mold.

As herein shown, the heat retaining ring is formed of two substantially identical semi-circular sections the adjoining ends of which are connected by a hinge 24 that is disposed externally of the abutting edges of the portions of the sections that form the wall 21 of the cover ring. The hinge 24 is positioned directly below the steam fittings 19 and 20 and the side walls 22 have notches 25 at their adjoining edges that receive the fittings 19 and 20. The opposite ends of the cover ring sections have notches 26 that receive the shanks of the eye bolts 15, and the ends of the cover ring sections which abut at the top of the mold are provided at opposite sides thereof with clamping latches that secure the free ends of the sections together and clamp the cover ring to the mold.

The two clamping latches may be identical and as herein shown, each has an elongated hook 27 pivoted at one end to a finger lever 28 intermediate its ends. The inner end of the lever 28 is connected to the side wall 22 of one of the sections by a pivot 29 that is spaced outwardly from the wall 22 and that is carried by a bracket 30 attached to the wall 22. The hook 27 engages in a slot 31 formed in the outwardly projecting flange 32 of an angle-shaped keeper plate 33 attached to the wall 22 of the section adjoining the section to which the bracket 30 is attached. The finger lever 28 swings about the pivot 29 from a position in which the lever engages the bottom of the bracket 30 which is positioned against the wall 22, in which position a straight line from the pivot of the hook 27 to the point of engagement of the hook with the flange 32 is disposed inwardly of the pivot 29 so that the lever will not yield to a pull on the hook and the ring sections are held in close engagement.

Outward movement of the finger lever 28 moves the hinged end of the hook 27 toward the keeper plate to permit release of the hook from the keeper plate. When both clamping latches are released the two sections of the cover ring can swing about the hinge 24 out of engagement with the mold. The peripheral wall 21 of the cover ring is provided with a heat reflecting lining 34 which is preferably in the form of a corrugated sheet of aluminum foil. The side walls 22 are provided with heat insulating linings 35 of sheet asbestos.

The mold side flanges 11 are preferably separately formed rings permanently attached to the central cylindrical portion 10 of the mold body. The flange rings 11 may be made of sheet metal of a somewhat heavier gauge then the sheet metal of the central portion 10 in order to stiffen the mold body and the inner portions 36 of the flange rings are preferably cylindrical and of a diameter such that the cylindrical central portion 10 fits within them, the cylindrical portions 36 of the flange rings being welded to the cylindrical member 10.

The steam coils 14 are preferably formed of a single length of pipe attached at one end to the fitting 19 and at the opposite end to the fitting 20. The coils 14 extend circumferentially in parallel relation throughout the circumference of the mold except for a short distance at the bottom of the mold between the fittings 19 and 20 where the coils have laterally inclined portions 37 connecting the ends of laterally offset parallel coils. The coils 14 are uniformly spaced across the cylindrical central portion of the mold and end coils 14a and 14b that are attached to the fittings 19 and 20 are positioned inwardly of the periphery of the mold and are attached to the flanges 11, the end coils 14a and 14b extending throughout the circumference of the flanges 11 except for a short space at one side of each of the fittings 19 and 20.

Figure 8:
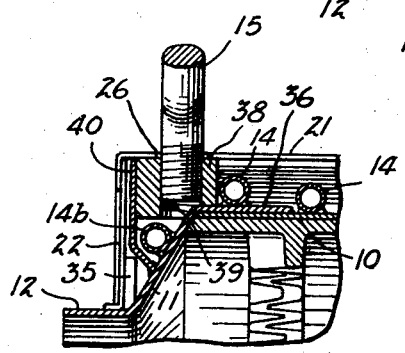
Fig. 8 is a fragmentary section taken on the line indicated at 8—8 in Fig. 1.
Figure 7:
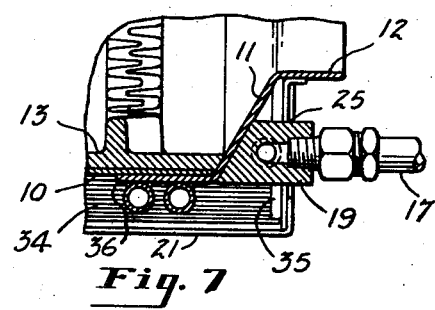
Fig. 7 is a fragmentary section taken on the line indicated at 7—7 in Fig. 1.

Hanger attaching blocks 38 are welded to the sheet metal body at opposite sides thereof at the top of the mold and are provided with threaded openings 39 to receive the eye bolts 15. As shown in Fig. 8, the blocks partially overlie the flanges 11 and are attached to the flanges 11 by means of plates 40 welded to the outer faces of the blocks and at their inner edges to the flanges 11, the plates 40 overlying the end coils 14a and 14b inwardly of the side walls 22 of the covering.

Figure 5:
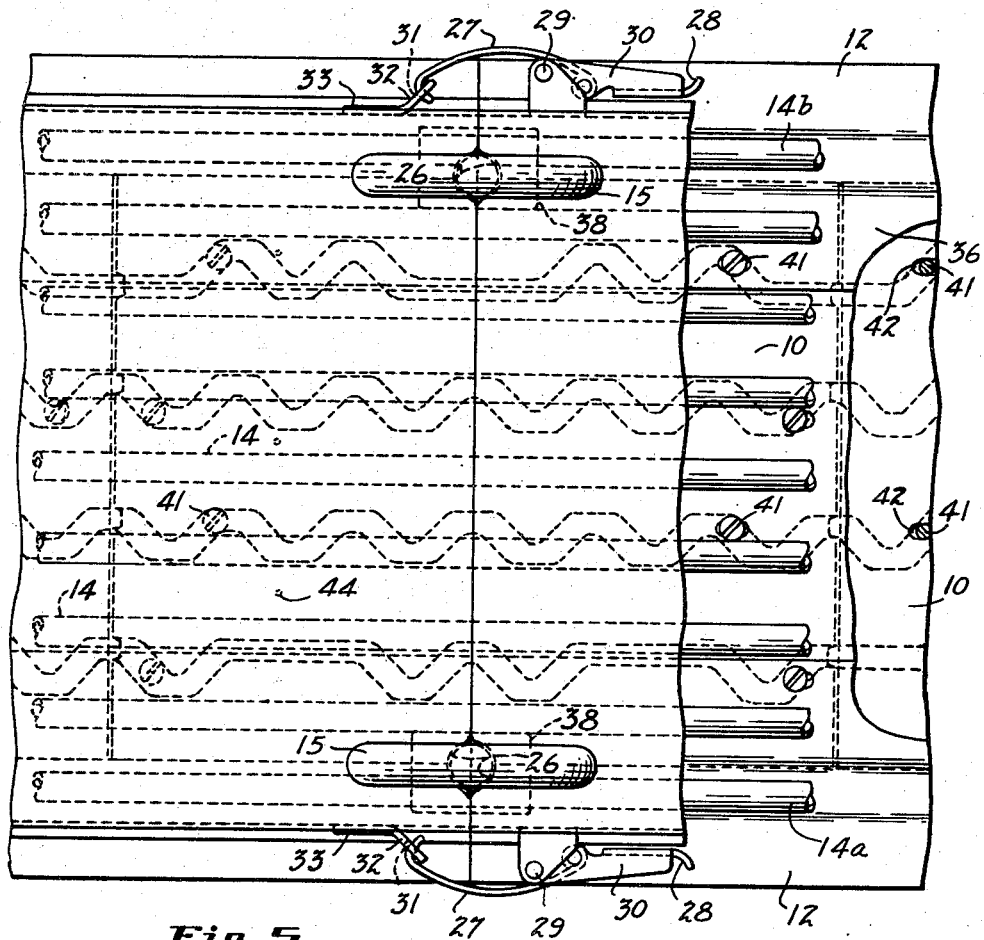
Fig. 5 is a fragmentary plan view of the portion of the mold shown in Fig. 4.
Figure 6:
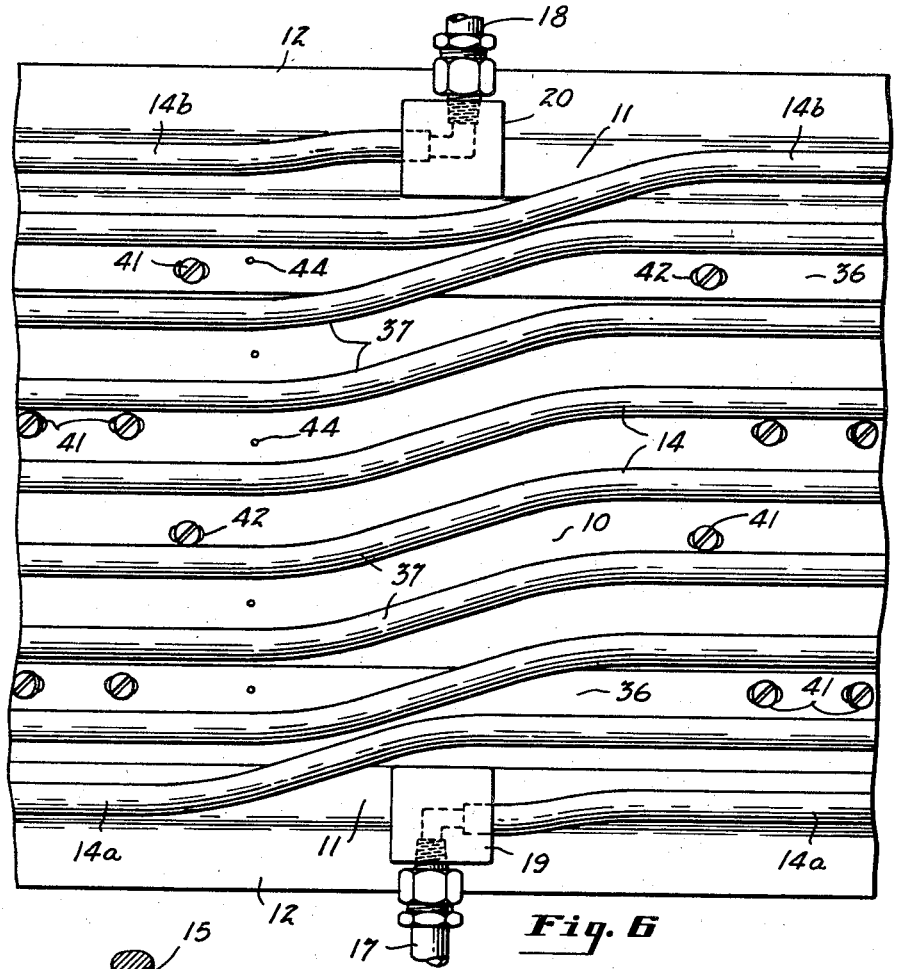
Fig. 6 is a fragmentary bottom plan view of the lower portion of the mold with the heat retaining ring removed and showing the inlet and drain fittings to which the steam coils are attached.

The mold segments 13 are attached to the cylindrical portion 10 of the sheet metal mold body by means of screws 41 that are threaded into the segments adjacent the ends thereof. The screws 41 pass through circumferentially elongated slots 42 in the sheet metal mold body so that the individual mold segments may have slight circumferential adjustments relative to the sheet metal body to which they are attached so that tight fitting joints between the segments may be provided by inserting shims between certain of the segments 13. The slots 42 will also permit slight relative movements between the sheet metal body and cast mold segments that may occur because of differing coefficients of heat expansion of metal such as steel and aluminum. The screws 41 are preferably positioned between the steam coils 14 and in engagement with thick portions of the mold segments. As shown in Figs. 4 and 5, the screws 41 engage with portions of the segment ribs that lie between adjacent steam coils 14 so that the screws are accessible for attachment or removal of segments without disturbing the steam coils. The segments 13 are provided with vent openings 43 that register with vent openings 44 in the cylindrical portion 10 of the mold body to permit escape of gases from the mold cavity during vulcanization of the tire tread.

By providing steam coils that directly contact the thin sheet metal shoulder engaging portions of the mold, heat is effectively applied to the edges of the retread stock to vulcanize the same and firmly bind the edges of the retread to the original tire casing.

The cover ring is of light weight and is removable by merely releasing the clamping latches connecting the top ends of the ring sections together so that the cover can be removed to permit any of the vent openings 43 and 44 which may have become clogged with rubber to be cleaned.

After the vulcanizing operation the retreaded tire casing may be removed from the mold by again spreading the tire beads to reduce the external diameter of the casing sufficiently to permit the casing to be withdrawn through one of the cylindrical openings within the shoulders 12 of the mold.

It is to be understood that in accordance with the provisions of the patent statutes, variations and modifications of the specific devices herein shown and described may be made without departing from the spirit of the invention.

What we claim is:

1. A retread mold comprising an endless circumferentially continuous sheet metal annulus having a substantially cylindrical central portion and inwardly flaring tread shoulder engaging flanges projecting inwardly at opposite side edges of said central portion toward the axis of said annulus, said flanges having outturned inner edge portions that form external circumferential shoulders, ribbed cast metal mold segments attached to the interior of said cylindrical portion, means attached to the exterior of said central portion and to the exterior of said flanges for applying heat thereto substantially throughout the circumference of the mold, and a detachable external heat retaining ring enclosing said heat applying means having a circumferential wall spaced radially outwardly from the central portion of said annulus and annular side walls spaced laterally outwardly of said shoulder engaging flanges and having inner edges separate from and in engagement with said circumferential shoulders.

2. A retread mold comprising an endless circumferentially continuous sheet metal annulus having a substantially cylindrical central portion and inwardly flaring tire shoulder engaging flanges projecting inwardly at opposite side edges of said central portion toward the axis of said annulus, said flanges having outturned inner edge portions that form external circumferential shoulders, ribbed cast metal mold segments attached to the interior of said cylindrical portion, means attached to the exterior of said central portion and to the exterior of said flanges for applying heat thereto substantially throughout the circumference of the mold, and a detachable external heat retaining ring separate from said annulus enclosing said heat applying means having a circumferential wall spaced radially outwardly from the central portion of said annulus and annular side walls spaced laterally outwardly of said shoulder engaging flanges and having inner edges in engagement with said circumferential shoulders, the circumferential wall of said heat retaining ring having a heat reflective inner face, the side walls of said ring having an inner lining of heat insulating material.

3. A retread mold comprising an endless circumferentially continuous sheet metal annulus having a substantially cylindrical central portion and inwardly flaring tread shoulder engaging flanges projecting inwardly at opposite side edges of said central portion toward the axis of said annulus, said flanges having outturned inner edge portions that form external circumferential shoulders, ribbed cast metal mold segments attached to the interior of said cylindrical portion, means attached to the exterior of said central portion and to the exterior of said flanges for applying heat thereto substantially throughout the circumference of the mold, an external detachable heat retaining ring enclosing said heat applying means having a circumferential wall spaced radially outwardly from the central portion of said annulus and annular side walls spaced laterally outwardly of said shoulder engaging flanges and having inner edges in engagement with said circumferential shoulders, said heat retaining ring being formed of two semicircular sections hingedly connected at adjoining ends to swing about a transverse axis adjacent the outer periphery of the ring, and means for detachably securing the free ends of the ring together.

4. A retread mold comprising an endless circumferentially continuous sheet metal annulus having a substantially cylindrical central portion and inclined tread shoulder engaging flanges at opposite sides of said central portion that have outturned inner edge portions forming outwardly facing circumferential shoulders, internally ribbed cast metal mold segments fitting between said side flanges of said sheet metal annulus and against the interior of said central portion, said segments abutting end to end and being secured to said central portion of the annulus, steam inlet and outlet fittings secured exteriorly one to each of said shoulder flanges substantially in transverse alinement, a steam pipe attached at its opposite ends to said fittings and having coils extending circumferentially around said annulus, said coils being in contact with the exterior surface of said annulus and secured thereto, and a detachable heat retaining ring separate from and secured to said annulus and enclosing said steam coils, said ring having a circumferential wall and side walls extending radially inwardly from said circumferential wall and having inner edges seated on said outwardly facing shoulders, said walls having openings to receive said fittings.

5. A retread mold comprising an endless circumferentially continuous sheet metal annulus having a substantially cylindrical central portion and frusto-conical tread shoulder engaging flanges at opposite sides of said central portion that have outturned inner edge portions forming outwardly facing circumferential shoulders, internally ribbed cast metal mold segments fitting between said side flanges of said sheet metal annulus and against the interior of said central portion, said segments abutting end to end and being secured to said central portion of the annulus, steam inlet and outlet fittings secured exteriorly one to each of said shoulder flanges substantially in transverse alinement, a steam pipe attached at its opposite ends to said fittings and having coils extending circumferentially around said annulus, said coils being in contact with the exterior surface of said annulus and secured thereto, the end coils of said pipe being in contact with and attached to said shoulder engaging flanges throughout nearly the entire circumference thereof, and a detachable heat retaining ring separate from and secured to said annulus and enclosing said steam coils, said heat retaining ring having a circumferential wall spaced radially outwardly of said coils and having a heat reflecting inner face, said ring having annular side walls extending inwardly from said circumferential wall and having inner edges seated on said external shoulders of said annulus outwardly of said shoulder engaging flanges.

6. A retread mold comprising an endless circumferentially continuous sheet steel annulus having a cylindrical central portion and inwardly flaring tread shoulder engaging flanges at opposite side edges of said central portion, internally ribbed cast aluminum mold segments, each of a width to fit between said shoulder engaging flanges and having an external face that fits the interior of the central portion of said annulus, said segments abutting end to end and covering the interior of said central portion, circumferentially elongated openings in said central portion of said sheet metal annulus, screws passing through said openings and threaded in said segments adjacent their ends to secure said segments to said annulus, and circumferentially extending steam heating coils secured externally to the central portion and to the shoulder engaging flanges of said annulus.

7. A retread mold comprising an endless circumferentially continuous sheet steel annulus having a cylindrical central portion and tread shoulder engaging flanges at opposite side edges of said central portion, internally ribbed cast aluminum mold segments, each of a width to fit between said shoulder engaging flanges and having an external face that fits the interior of the central portion of said annulus, said segments abutting end to end and covering the interior of said central portion, means securing said segments to the central portion of said annulus, steam coils extending circumferentially around said annulus, certain of said coils being in contact with and secured to said central portion of the annulus and other of said coils being in contact with and secured to said shoulder engaging flanges, and a detachable heat retaining ring separate from and secured to said annulus and enclosing said coils, said heat retaining ring having a circumferential wall spaced radially outwardly of said coils and side walls bridging the space between said circumferential wall and said shoulder engaging flanges.

8. A retread mold comprising an endless circumferentially continuous sheet metal annulus having a substantially cylindrical central portion and flaring tread shoulder engaging side flanges, said flanges having outturned inner edges forming external circumferential shoulders, means attached to the exterior of said central portion and to the exterior of said flanges for applying heat thereto, a detachable external heat retaining ring having an external circumferential wall surrounding said annulus spaced radially outwardly from said heating means and side walls bridging the space between said circumferential wall and said external circumferential shoulders, a heat reflective lining of aluminum foil within said circumferential wall, and linings of asbestos sheet material on the interior of said side walls.

9. A retread mold comprising an endless circumferentially continuous sheet metal annulus having a substantially cylindrical central portion and inwardly flaring tread shoulder engaging side flanges, said flanges having outturned inner edges forming external circumferential shoulders, means attached to the exterior of said central portion and to the exterior of said flanges for applying heat thereto, an external detachable heat retaining ring having an external circumferential wall surrounding said annulus spaced radially outwardly from said heating means and side walls bridging the space between said circumferential wall and said external circumferential shoulders, said heat retaining ring comprising two semicircular sections having two adjoining ends hingedly connected, and means for detachably connecting the free ends of said ring to secure the same to said annulus.

10. A retread mold comprising an endless circumferentially continuous sheet metal annulus having a substantially cylindrical central portion and inwardly flaring tread shoulder engaging side flanges, said flanges having outturned inner edges forming external circumferential shoulders, means attached to the exterior of said central portion and to the exterior of said flanges for applying heat thereto, an external detachable heat retaining ring having an external circumferential wall surrounding said annulus spaced radially outwardly from said heating means and side walls bridging the space between said circumferential wall and said external circumferential shoulder, said heat retaining ring comprising two semicircular sections formed of sheet metal and hingedly connected at two adjoining ends, means for detachably securing the free ends of said ring together to secure the same to said annulus, a heat reflective lining of aluminum foil within said circumferential wall, and linings of asbestos sheet material on said side walls.

11. A retread mold comprising an endless circumferentially continuous sheet metal annulus having a central substantially cylindrical sheet metal member and sheet metal stiffening rings at opposite sides of said central member, each of said rings having a cylindrical flange overlying and secured to said central member, a frustoconical tread shoulder engaging portion and a substantially cylindrical inner edge portion forming an external circumferential shoulder, two laterally alined hangers one attached to each of said stiffening rings, a steam inlet and a drain outlet fitting, one attached to one of said stiffening rings and one attached to the other in substantially transverse alinement therewith, said fittings being substantially diametrically opposite said hangers, a steam pipe having one end attached to said inlet fitting and the other to said outlet fitting, said pipe extending circumferentially around said annulus in a series of coils that contact with said annulus, a detachable heat retaining ring having a circumferential wall surrounding said annulus and spaced radially outwardly of said coils and side walls that bridge the space between said circumferential wall and said external circumferential shoulders, said heat retaining ring comprising two sections having two adjoining edges hinged together and providing notches at said adjoining edges to receive said fittings, the free ends of said sections having notched portions to accommodate said hangers, and means for detachably securing said free ends together to secure said heat retaining ring on said annulus.

References Cited in the file of this patent

UNITED STATES PATENTS

| | | |
|---|---|---|
| 1,548,215 | Semler | Aug. 4, 1925 |
| 1,668,017 | Henson | May 1, 1928 |
| 2,088,130 | Broering et al. | July 27, 1937 |
| 2,322,546 | Sepin | July 22, 1943 |
| 2,331,680 | Hawkinson | Oct. 12, 1943 |
| 2,333,588 | Schaevitz | Nov. 2, 1943 |
| 2,370,972 | Kraft | Mar. 6, 1945 |
| 2,418,584 | Hawkinson | Apr. 8, 1947 |
| 2,468,121 | Shell | Apr. 26, 1949 |
| 2,526,461 | Dibdin | Oct. 17, 1950 |
| 2,599,433 | Cohen | June 3, 1952 |
| 2,651,078 | Hawkinson | Sept. 8, 1953 |